United States Patent [19]

Sciaky

[11] 4,012,620
[45] Mar. 15, 1977

[54] ELECTRON BEAM SEAM FINDING DEVICE
[75] Inventor: Peter Daniel Sciaky, Oak Lawn, Ill.
[73] Assignee: Sciaky Bros., Inc., Chicago, Ill.
[22] Filed: Jan. 20, 1975
[21] Appl. No.: 542,091
[52] U.S. Cl. .................. 219/121 EM; 219/121 EB; 219/125 PL
[51] Int. Cl.² .......................................... B23K 9/00
[58] Field of Search ............. 219/121 EB, 121 EM, 219/125 PL, 125 R; 250/492
[56] References Cited
UNITED STATES PATENTS

| 3,576,420 | 4/1971 | Iceland et al. | 219/121 EB |
| 3,609,288 | 9/1971 | Sciaky | 219/121 EM |
| 3,775,581 | 11/1973 | Sciaky | 219/121 EM |

*Primary Examiner*—J. V. Truhe
*Assistant Examiner*—N. D. Herkamp
*Attorney, Agent, or Firm*—Julius L. Solomon

[57] ABSTRACT

This invention relates to a method and apparatus for determining the relative position between the point of impingement of an electron beam on a work surface and the seam between parts to be welded. The seam is scanned by oscillating a low power electron beam along a path transverse to the scan. The variation in secondary electrons generated as the beam traverses the seam is detected and amplified. The amplified signal is then acted upon by an electronic converter which converts the wave form by instantaneously taking the Nth root at each point of the curve representing the wave form of the amplified secondary electron current wave form so as to improve the resolution of the signal and make possible an improved definition at the point of impingement of the beam with respect to the seam.

6 Claims, 6 Drawing Figures

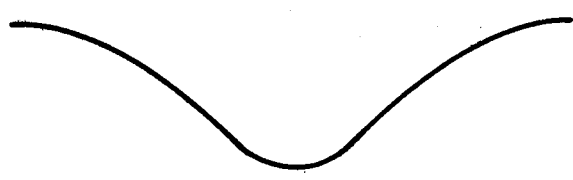
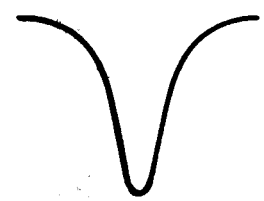
FIG. 1
FIG. 2
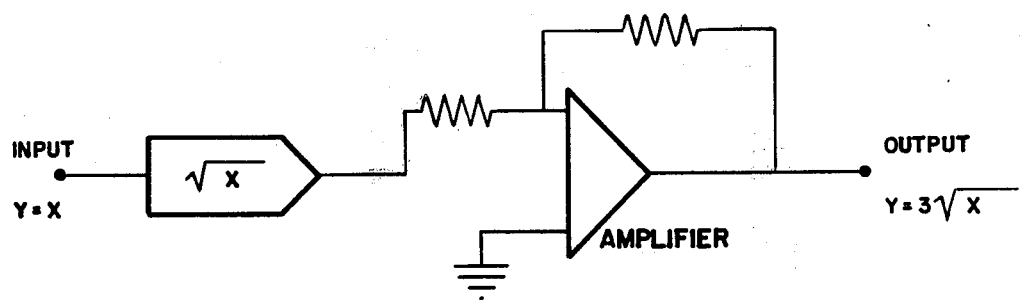
FIG. 3
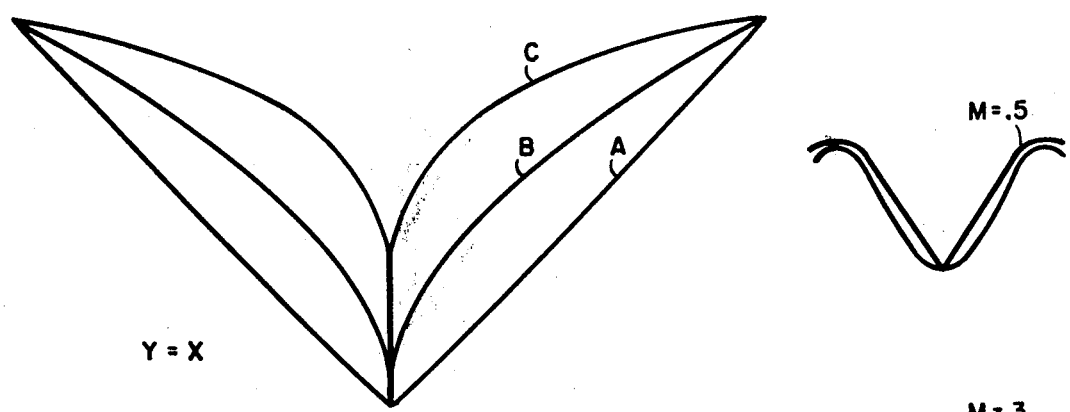
FIG. 4
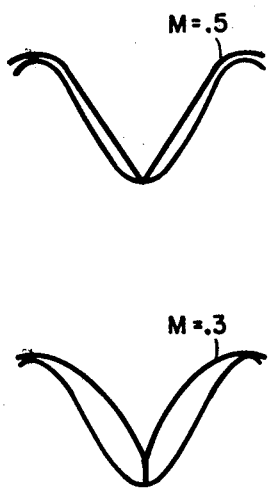
FIG. 5

ELECTRON BEAM SEAM FINDING DEVICE

This invention relates to electron beam seam finders and, more specifically, to a signal reshaping circuit to improve the resolution of the signal derived from electron beam scanning.

An important requirement in the process of electron beam welding of work pieces is to locate, track and align the electron beam over the seam between the two parts to be welded. A method for determining the point of impingement of an electron beam with reference to the position of the seam between the parts to be welded which is in widespread use today utilizes the electron beam itself to determine the relationship between the beam and the seam and operates as follows.

The electron beam is oscillated along the line transverse to the seam. Secondary electrons emitted from the surface of the work pieces being scanned by the oscillating beam are collected by an electrode mounted above the work surface. The changes in secondary electron current through the electrode are displayed on the face of a cathode ray oscilloscope whose horizontal sweep is controlled by an oscillator which also generates the electron beam scanning wave form controlling the motion of the beam. U.S. Pat. No. 3,609,288 describes this method and in FIG. 2 of that patent is illustrated a typical wave form obtained during the scan across a seam. In most instances this method has proved to be highly satisfactory allowing one to determine the position of the beam with respect to the seam with high precision. There are, however, certain joint configurations of the work pieces which result in wave forms on the viewing oscilloscope which are rather broad so that it becomes difficult to find the seam with the required precision. The object of the present invention is to provide a method whereby a signal may be obtained from the scanning which will allow a more accurate and precise determination of the position of the seam with respect to the beam for such joint configurations.

A further object of the invention is to provide a method whereby a scanning signal may be reshaped so as to improve its resolution.

Another object is to provide an electrical periodically changing signal reshaping circuit whereby the slope of the curve representing that signal is increased as the curve approaches zero.

Further objects, features and advantages of the method will be apparent from the following description of the method and of the apparatus taken in connection with the accompanying drawings in which:

FIG. 1 illustrates a wave form which may be obtained in scanning a seam with an electron beam.

FIG. 2 illustrates the signal derived from the wave form of FIG. 1 passed through the signal reshaping circuit.

FIG. 3 illustrates an elementary form of the reshaping circuit.

FIG. 4 illustrates the reshaping of a triangular wave form with the circuit illustrated in FIG. 3.

FIG. 5 illustrates the reshaping of a sinosoidal wave using the circuit of FIG. 3.

The method in accordance with the invention consists of obtaining the original scanning signal as is done in accordance with U.S. Pat. No. 3,609,288 and processing this electrical signal so that each point of the curve representing the signal is operated on by an electronic analog converter so as to obtain a fractional root of the value of the wave form at that point. Thus, for example, the curve $Y = \pm X$ of FIG. 4a will take the form shown at 4b if it is converted by taking the square root by the operation $Y = KX^{0.5}$. The fourth root of curve A is obtained by cascading two of the circuits of FIG. 3. If we convert the curve $Y = \pm X$ by applying it to the input of the cascaded circuit we will obtain at the output the curve shown in FIG. 4c. The position of the beam with respect to the seam can be defined with much greater precision by utilizing a wave form similar to 4c rather than like 4a or 4b, inasmuch as the dead band between opposite sides of the curve is extremely small in 4c as the curve approaches zero for voltages close to the point of the curve which defines the position. For automatic positioning equipment where the scanning signal is matched against a position reference the narrowness of the curve is extremely important in order to limit the possibility of error in defining the position of the electron beam point of impingement on the work with respect to the seam between the work pieces. In automatic seam tracking operations in which the coordinates of the path of the seam must be recorded and then played back it is necessary to have extremely high precision in the determination of the position of the seam.

FIG. 5 illustrates the transformation that results when a wave form which follows the sine function is converted by raising each point on the curve $Y = \sin x$ to the 0.5 and 0.3 powers respectively.

Figure 6:
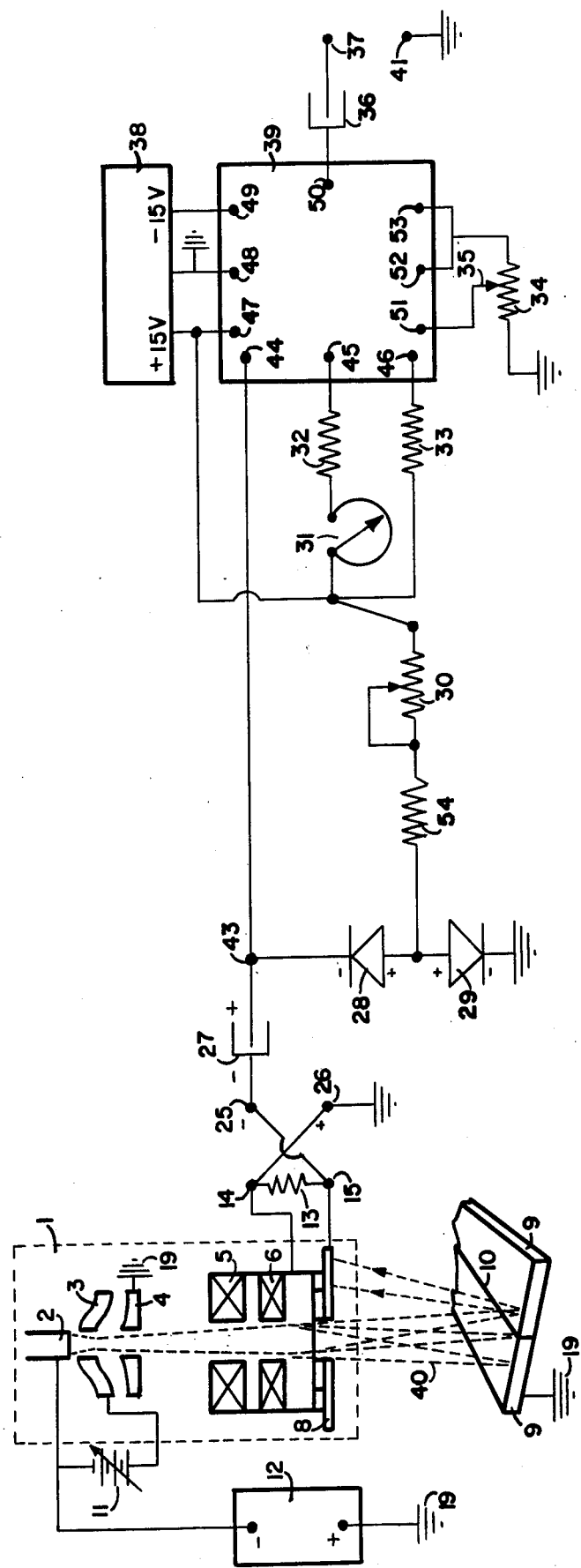
FIG. 6 is a circuit diagram illustrating a practical embodiment of the invention.
Figure 6:
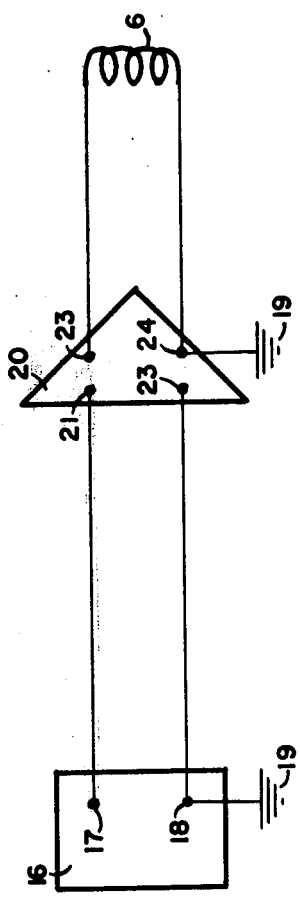

FIG. 6 illustrates in greater detail than FIG. 3 the circuit diagram of a practical embodiment of the reshaping system in accordance with the invention. A converter 39 which performs the transfer function $$E_o = {}_{10}\left(\frac{E_i}{10}\right)^M$$

and which may be adjusted in order to obtain any desired fractional power of an input function is utilized to perform the signal shaping. The electron gun 1 comprises an electron emitter 2, a cathode 3, an anode 4, which generates an electron beam 40 which is focused by focus coil 5 and caused to move through the action of electromagnetic deflection coil 6. By passing periodic current of suitable wave form through deflection coil 6 electron beam 40 may be caused to sweep transversely across the seam 10 between the work pieces 9 which adjoin each other. The electrons emitted by emitter 2 are accelerated towards the anode 4 because of the application of a high accelerating potential from the high voltage power supply 12 whose positive terminal is connected to the frame of the machine represented by the ground 19. The cathode and anode electrodes within the electron gun form the electrons into a tight bundle forming a beam which after passing through an aperture in the anode 4 moves through the electrostatic field free space between the anode and the work. In order to control the intensity of the electron flow (the electron beam current) an adjustable biasing potential 11 is applied between the emitter 2 and the cathode electrode 3. An increase in negative potential applied to the cathode with respect to the emitter will reduce the flow of electron current. Electrons in passing at high velocity through the aperture of the anode 4 enter the field free space where they are acted upon by the electromagnetic focusing coil 5 which focuses the electron beam to a desired spot upon the work 9 and then through the magnetic field created by deflection coil 6. As the beam 40 is deflected across the seam 10 secondary electrons are released from the surface of the work depending upon the position of the beam with respect to the seam. When the beam strikes the surface of the work piece the secondary electron current will be high. As it passes across the seam the electron current will start dropping until it reaches a minimum and then will increase until it reaches again the level indicating that the beam is striking the surface. A graph showing the variations of secondary electron current as the beam sweeps the gap is shown in FIG. 1. The secondary electron current passing through resistor 13 will develop a voltage which varies in accordance with the form shown in FIG. 1 across the terminal 14 and 15 of resistor 13. The electron beam 40 is made to sweep transversely across the seam through the action of wave form generator 16 whose terminals 17 and 18 are connected to terminals 21 and 22 of amplifier 20. The output terminals 23 and 24 of amplifier 20 are connected to deflection coil 6. With the wave form generator energized the electron beam will be caused to scan the seam from left to right and then return from right to left through the action of the alternating current passing through deflection coil 6. The voltage appearing across the terminals 14 and 15 is fed to terminals 25 and 26 of the fractional power function circuit. The signal is passed through the DC restorer circuit comprising capacitor 27 and diodes 28 and 29. The signal appearing across terminals 25 and 26 is clamped to zero ground at its trough through the action of capacitor 27 and diode 28. Whenever the signal connected to terminals 25 and ground 26 makes a negative excursion the diode 28 will pass current through resistor 54 and variable resistor 30 through the power supply 38 to ground placing a charge across capacitor 27 whihch is equal to the maximum negative excursion of the signal. The input terminal 44 of the fractional power converter 39 will have applied to it the sum of the input pulse wave form plus the voltage across capacitor 27 so that the signal presented to terminal 44 will always be positive going with respect to ground. Diode 29 is connected in opposition in series with diode 28 so that between point 43 and the ground the voltage drop across 28 is cancelled by the voltage drop across diode 29 so that in the quiesence state terminal 44 is held essentially to ground potential. Resistance network 31, 32 and 33 is connected to terminals 45 and 46 of converter 39. Varying variable resistor 31 is an adjustment by which the maximum output voltage may be adjusted so that it is equal to the maximum input voltage. Potentiometer 34 connected between terminals 51 and 52, 53 is an adjustment which is utilized to determine the desired fractional power by which the input signal is to be converted. The voltage which appears at 50 will be the fractional power of the voltage appearing at terminal 44 of the converter 39. The fractional power of the voltage appearing at terminal 44 of the converter 39 that is the signal appearing across terminal 50 and ground may be transferred through capacitor 36 to terminals 37 and 41. Through the use of the system in accordance with the present invention the resolution of the signal such as is used for determining the position of a seam with respect to an electron beam may be improved in resolution so that the position of the seam may be discriminated with great precision.

What I claim is:

1. A method of determining the position of an electron beam with respect to the seam between two adjoining work pieces comprising the steps of directing the said beam towards the seam between the adjoining work pieces; oscillating the beam across the seam and work pieces to cause variations in the emanation of secondary electrons from the said work pieces; collecting secondary electrons thus produced; passing the said secondary electrons through a resistor so as to generate a varying voltage proportional to the instantaneous value of the secondary electrons collected; applying the said varying voltage to a wave form converter, converting the instantaneous values of said varying voltage, in said converter, to a fractional power of said instantaneous values of said voltage applying the output signal of the converter to one set of deflection plates of a cathode ray oscilloscope provided with two pairs of deflection plates at right angles to one another whose second set of deflection plates is synchronized with the periodic signal causing the oscillation of the beam across the seam and comparing the position of the peak of the said converted voltage with a preset reference.

2. A method in accordance with claim 1, including the step of clamping the most negative going point of the signal derived from the secondary electrons to the potential at one of the input terminals of the aforesaid wave form converter.

3. A method as in claim 1 including the further step of applying the output signal of the said converter to a discriminating circuit and comparing the signal to a preset voltage level so as to automatically define the point at which the wave traverses the said preset voltage level.

4. A method as in claim 1 including an additional step of providing a marker on the cathode ray oscilloscope trace which defines the resting position of the beam upon the work piece with respect to a given point on the periodic voltage causing oscillation of the beam across the seam.

5. In an electron beam apparatus having means for generating, accelerating and focusing a beam of electrons upon adjoining work pieces; additional means for periodically deflecting the said beam along the path which crosses the seam between the said work pieces; means for collecting secondary electrons generated as the beam is periodically deflected along the said path; means for generating a signal representing the intensity of the said secondary electrons; means for converting the said signal by electronically converting each point on the curve representing the said signal to a fractional power of the value of the current at each point on the said curve; and oscilloscopic means for displaying the wave form at the output terminals of the said converter.

6. Apparatus as in claim 5, including additional means for automatically determining the point on said converted wave form which corresponds to a preset voltage level.

* * * * *